(12) United States Patent
Mestery et al.

(10) Patent No.: US 9,602,415 B2
(45) Date of Patent: *Mar. 21, 2017

(54) FLOW BASED NETWORK SERVICE INSERTION

(71) Applicant: Cisco Technology, Inc., San Jose, CA (US)

(72) Inventors: Kyle Andrew Donald Mestery, Woodbury, MN (US); Debojyoti Dutta, Santa Clara, CA (US); Edgar Francisco Magana Perdomo, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,034

(22) Filed: Oct. 7, 2015

(65) Prior Publication Data

US 2016/0036707 A1 Feb. 4, 2016

Related U.S. Application Data

(63) Continuation of application No. 14/014,742, filed on Aug. 30, 2013, now Pat. No. 9,203,765.

(51) Int. Cl.
*G01R 31/08* (2006.01)
*H04J 3/14* (2006.01)
(Continued)

(52) U.S. Cl.
CPC ...... *H04L 47/2408* (2013.01); *H04L 12/4633* (2013.01); *H04L 12/4641* (2013.01);
(Continued)

(58) Field of Classification Search
CPC ............................ H04L 41/50; H04L 12/4654
See application file for complete search history.

(56) References Cited

U.S. PATENT DOCUMENTS 8,311,045 B2 11/2012 Quinn et al.
8,442,043 B2 5/2013 Sharma et al.
(Continued)

OTHER PUBLICATIONS

IETF( Layer 4-7 service chain problem statement, Jul. 11, 2013, Network working group,; Dunbar and estlake; pp. 1-24).*
(Continued)

*Primary Examiner* — Maharishi Khirodhar
(74) *Attorney, Agent, or Firm* — Edell, Shapiro & Finnan, LLC (57) ABSTRACT

Techniques are provided to generate and store a network graph database comprising information that indicates a service node topology, and virtual or physical network services available at each node in a network. A service request is received for services to be performed on packets traversing the network between at least first and second endpoints. A subset of the network graph database is determined that can provide the services requested in the service request. A service chain and service chain identifier is generated for the service based on the network graph database subset. A flow path is established through the service chain by flow programming network paths between the first and second endpoints using the service chain identifier.

20 Claims, 8 Drawing Sheets (51) Int. Cl.
| | |
|---|---|
| H04L 1/00 | (2006.01) |
| H04L 12/851 | (2013.01) |
| H04L 12/24 | (2006.01) |
| H04L 29/08 | (2006.01) |
| H04L 12/46 | (2006.01) |

(52) U.S. Cl.
CPC .............. *H04L 41/12* (2013.01); *H04L 41/50* (2013.01); *H04L 67/10* (2013.01)

(56) References Cited

U.S. PATENT DOCUMENTS

| | | | |
|---|---|---|---|
| 2008/0177896 A1 | 7/2008 | Quinn et al. | |
| 2010/0165985 A1 | 7/2010 | Sharma et al. | |
| 2011/0055845 A1* | 3/2011 | Nandagopal | H04L 67/1023 718/105 |
| 2014/0105039 A1* | 4/2014 | McDysan | H04L 41/5051 370/252 |
| 2014/0307744 A1* | 10/2014 | Dunbar | H04L 45/44 370/401 |
| 2014/0372617 A1* | 12/2014 | Houyou | H04L 41/145 709/226 |
| 2015/0063102 A1 | 3/2015 | Mestery et al. | |

OTHER PUBLICATIONS

Amir, et al., "An Active Service Framework and its Application to Real-time Multimedia Transcoding, " in Proc. ACM SIGCOMM Conference (SIGCOMM '98), Sep. 1998, 12 pages.

Fernando, et al., "Virtual Service Topologies in BGP VPNs," Internet Engineering Task Force (IETF), Internet-Draft, Oct. 14, 2012, 10 pages.

McKeown, et al., "OpenFlow: Enabling Innovation in Campus Networks," ACM SIGCOMM Computer Communication Review, vol. 38, No. 2, Apr. 2008, 6 pages.

Amazon Web Services, "Amazon Simple Workflow Service Developer Guide,"retrieved from http://aws.amazon.com/documentation/swf/, on Aug. 30, 2013, 90 pages.

Cisco, "Cisco vPath and vServices Overview," retrieved from http://www.cisco.com/en/US/docs/switches/datacenter/vsg/sw/4_2_1_VSG_1_4_1/vpath_vservices/reference/guide/vpath_vservices_overview.html, on Aug. 30, 2013, 10 pages.

Elio Salvadori (Generalization virtual network topologies in OPENFlow-based networks, 5-9 of Dec. 2011, entire document, IEEE).

* cited by examiner

FLOW BASED NETWORK SERVICE INSERTION

CROSS-REFERENCE TO RELATED APPLICATION

This application is a continuation of U.S. application Ser. No. 14/014,742, filed Aug. 30, 2013, the entirety of which is incorporated herein by reference.

TECHNICAL FIELD

The present disclosure relates to inserting services into a network using a service flow.

BACKGROUND

Cloud Service Providers (CSPs) provide a scalable multi-tenant cloud infrastructure. To implement the multi-tenant cloud infrastructure CSPs have need to deliver layer 2 and layer 3 network services or functions, e.g., firewalls, load balancers, network accelerators, etc. Network services may be daisy-chained, thereby forming a service chain. Service chains define a set of layer 2 and layer 3 service functions and their order, e.g., service1→to→service2, to be applied to selective packets as they are forwarded through a network. The order in which services are applied is predetermined through an orchestration function and that order is mapped into each network node that is involved in the forwarding of packets through a given service chain. The mapping of forwarding state-to-service chain structure is referred to as a service path. The service path for a given service chain may be unidirectional or bidirectional dependent on whether one or more of the service functions in the chain hold state information that needs to be maintained in the forward and reverse packet forwarding paths.

DESCRIPTION OF EXAMPLE EMBODIMENTS

Overview

Presented herein are techniques to generate and store a network graph database comprising information that indicates a service node topology, and virtual or physical network services available at each node in a network. A service request is received, the service request is for services to be performed on packets traversing the network between at least first and second endpoints. A subset of the network graph database is determined that can provide the services requested in the service request. A service chain and service chain identifier (ID) is generated for the service based on the network graph database subset. A flow path is established through the service chain by flow programming network paths between the first and second endpoints using the service chain ID.

Example Embodiments

A service chain is a data structure comprised of an ordered list of service functions to be applied to packets that are forwarded along the chain. The specific instances of traversed service functions form a service path. Each individual service function referenced by the service chain may be deployed at multiple locations and therefore each chain may be executable through one or more independent service paths. Typical data link layer (layer 2 or "L2") and Internet Protocol (IP) layer (layer 3 or "L3") services, e.g., firewall, load balancing, network address translation (NAT), Deep Packet Inspection (DPI), etc., may use flow state information that is maintained for the forward (and reverse) traffic flows for forwarding packets through the same service functions at the same locations in the network. A service location is also referred to herein as a service node.

In current state of the art systems, service chains are constructed using a centralized controller function and pushed out to each network node before traffic is allowed to flow through the service chain. The information pushed by the controller includes not only the details of the service chain data structures but also the state information necessary for successful packet forwarding. In this sense service chain structure and forwarding state are tightly coupled and controlled by the central controller.

Each individual service function in the service chain is represented using a unique service-identifier (ID or id) and each service chain is represented using a unique service-path-id. The correlation/mapping of the service-id's and service-path-id forms the service chain. For example a service chain may be represented conceptually below, where "Y" and "Z" are variable identifiers of a convenient form:

Service chain Y=service-path-id [Z]=[service-id$^1$, service-id$^2$, service-id$^3$].

Service chains are constructed via a central controller that determines the order of service functions that should be applied for the chain and allocates a globally unique service-path-id for each service chain it creates. To perform this function the controller keeps a "service-id" and the corresponding service locations, e.g., in a data structure, that uses a map of the service-id to the endpoint locations that may be identified by an address such as the service node's IP address.

Packet forwarding through a service chain is unidirectional and driven by information contained within network service headers carried in the data plane. Each service node or the beginning node acts as a packet classifier into the service chain and determines which traffic flows require redirection through the service chain, imposing the necessary data plane network service headers and transport encapsulation to force the traffic into the service chain. Each service function is aware of its own service-id and the location of the next service in a chain.

Presented herein are techniques to represent physical service nodes, virtual service nodes hosted by physical nodes, and the associated services provided by each physical or virtual service node, as well as the associated connectivity between nodes in a graph database (DB), e.g., Neo4j, HyperGraphDB, or other graph DB that may or may not conform to Resource Description Framework (RDF) specifications and provide functionality beyond traditional Structured Query Language (SQL) relational DB functionality.

The techniques described herein further provide for using the graph DB to feed or supply the information in the graph DB to a flow programming function, e.g., OpenFlow, which has access to the forwarding plane. For example, the flow programming function can establish forwarding flows through switches, routers, service nodes, etc., in a mapped fashion. In essence, the flow programming function maps service flows onto the graph to obtain desired or requested packet services between network endpoints.

Figure 1:
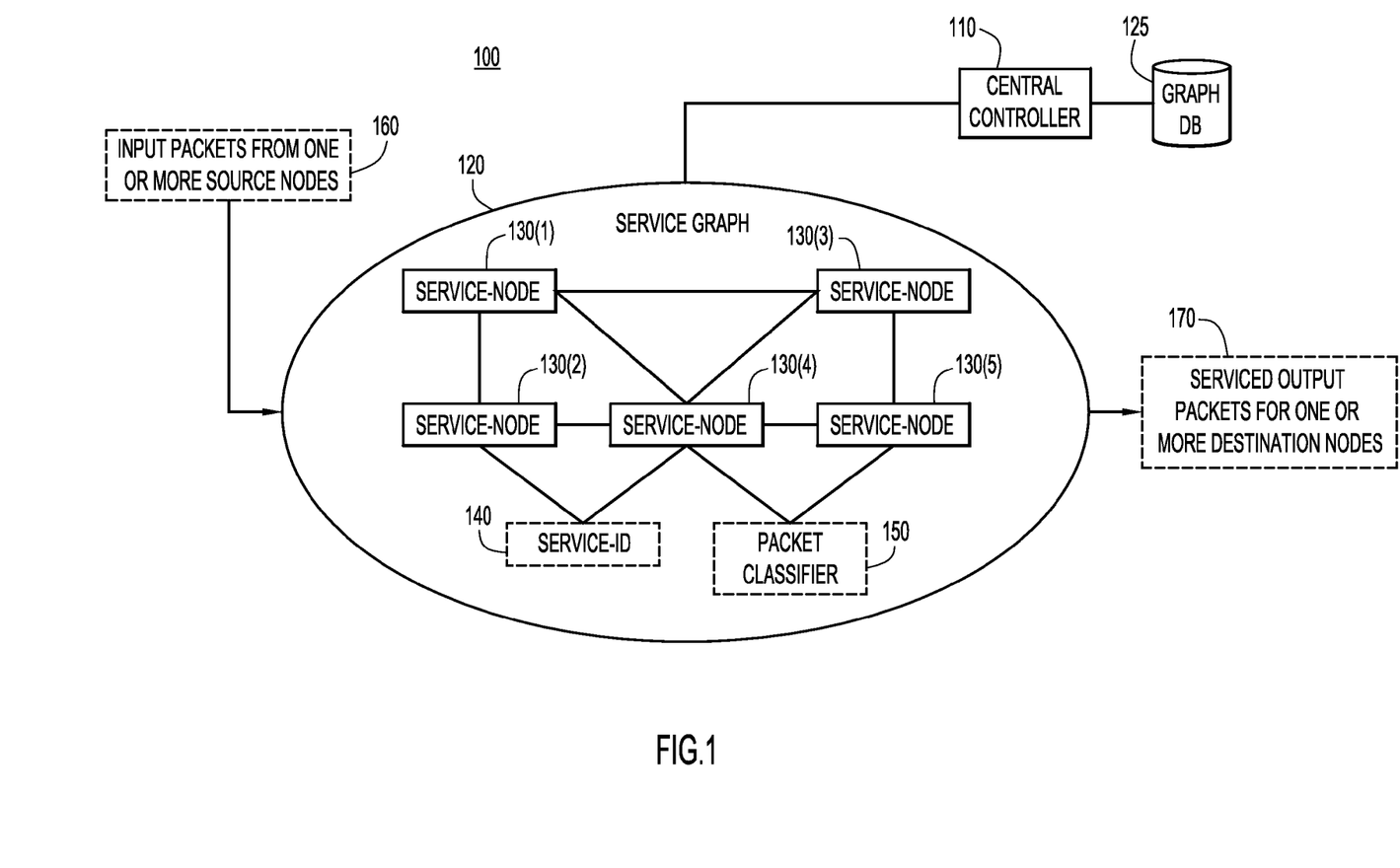
FIG. 1 shows an example of a network graph with service nodes and a central controller configured to establish service chains using flow programming based on the graph.

Referring to FIG. 1, a diagram is shown for a network graph with service nodes and a central controller configured to establish service chains using flow programming based on the graph for purposes of illustrating the techniques presented herein. A network 100 is shown along with a central controller 110. The network has a plurality of physical and/or virtual nodes represented as a topology or graph 120. The graph 120 depicts a plurality of service nodes 130(1)-130(5), at least one service-id 140, and a packet classifier 150. The service-id 140 may be associated with any number or combination of nodes 130(1)-130(5), e.g., one node, two nodes and so on, for the forwarding path through those nodes. The packet classifier 150 may be associated with any individual node 130(1)-130(5) and is usually a function of the start or head-end node in the service chain. As such, service-id 140 and packet classifier 150 are depicted as dashed boxes because they may each be associated with or part of and given node in graph 120.

The service nodes 130 on graph 120 perform network services for one or more input packets 160 that are received from one or more source nodes (not depicted). After processing by the one or more of the service nodes 130, the serviced packets are ultimately forwarded or output at 170 to one or more destination nodes. In this regard, the serviced packets may travel from a single endpoint to another single endpoint or be part of a multicast group in which serviced packets are sent to a plurality of endpoints. It should be noted that even in a multicast scenario, each packet may receive a different service depending on its particular classification.

The service-id 140 operates as generally described above. The packet classifier 150 may also be part of central controller 110 and classifies packets according to the services that are to be rendered for a particular packet and direct that the packet be sent to the first service node in the service chain and may assign metadata or insert header information to enable the packet to traverse its service chain according to its classification. The service-id and service chain-id provided by packet classifier 150 indicate the appropriate path through one or more of the nodes 130(1)-130(5). Accordingly, the classifier has access to the services within the service nodes represented by graph 120. According to the techniques described herein, the central control 110 determines a subset of graph 120 that can perform the packet services per packet classifier 150.

Once the central controller 110 receives a service request between two endpoints, and "carves" out a graph subset, the central controller 110 programs each packet flow by way of a flow programming mechanism. Flow programming allows the central controller 110, using a graph DB that 125 contains data representing the service topology, e.g., graph 120, to control forwarding through network service nodes to obtain the desired services from those nodes.

In order to determine a subset of graph 120, the central controller 110 uses information contained in the graph DB 125. Thus, graph 120 shows a potential physical or virtual layout of service nodes 130(1)-130(5). In reality, when data representing graph 120 is stored as a database (e.g., in graph DB 125), it contains a myriad of information such as node services, connection availability and properties between different service nodes.

Consider a family tree with three nodes, Bob, Mary, and Sue. Bob, Mary, and Sue have node properties such as location, phone number, and email address. Thus, when considering location only the nodes may be depicted as Bob-Chicago, Mary-New York, and Sue-small town, USA.

Furthermore, there are relationships between the nodes, e.g., Bob may be Mary's uncle and Sue may be Mary's daughter. Many other relationships are possible, e.g., friend, married, divorced, etc. When the family tree is mapped onto a network, e.g., the Internet, other relationships are possible. For example, Bob and Mary may share high speed, long haul, fiber connections between Chicago and New York, while Sue has a very slow telephone modem because that is the only service available in small town, USA. Accordingly, the techniques described herein leverage the scalable network features modeled with a graph DB when the graph DB is applied to a large service set, e.g., a service set that is available in a data center. Using the information in graph DB 125, the central controller 110 can determine a subset of the graph for a particular service.

Figure 2A:
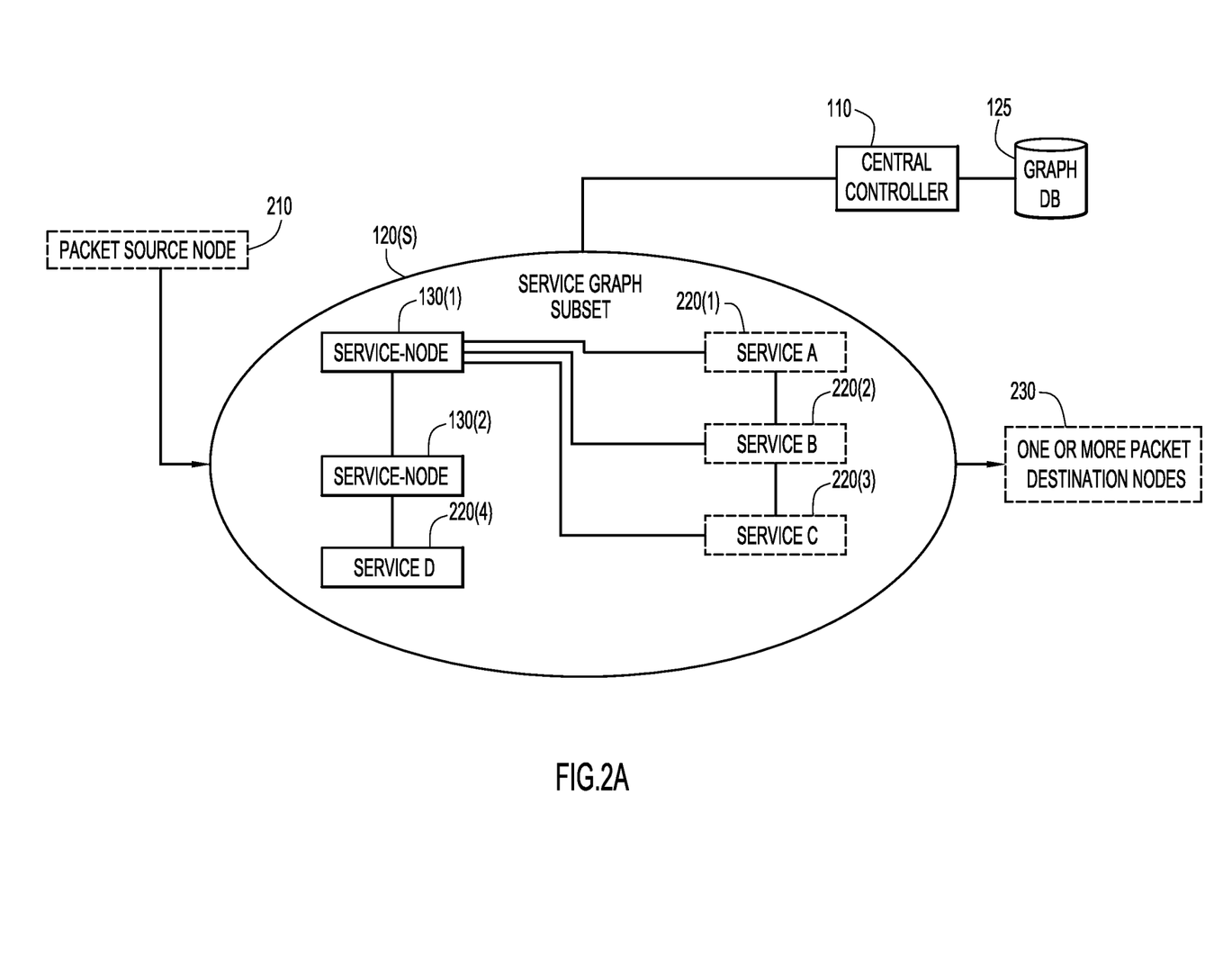
FIG. 2A shows an example of a subset of the network graph shown in FIG. 1 that includes network services mapped to service nodes.

FIG. 2A shows an example of a subset of the network graph 120 from FIG. 1 and indicated by reference numeral 120(S). In this example, a single packet source node 210 and one or more packet destination nodes 230 are depicted. A specific request has been received by the central controller 110 to service packets originating at source node 210 for servicing and forwarding to destination nodes 230. The central controller has analyzed graph 120 (based on data stored in the graph DB) and determined that graph subset 120(S) can fulfill the request. Graph subset 120(S) includes service nodes 130(1) and 130(2). Additional service granularity is achieved by individual services 220(1)-220(4) that are labeled Service A, B, C, and D, respectively. Services A, B, and C are mapped to or associated with service node 130(1) and Service D is associated with service node 130(2). Services 220(1)-220(3) are depicted as dashed boxes because they may be virtualized and running as virtual machines (VMs) on service node 130(1). Alternatively, any of the service nodes may operate as a VM, be a compute or storage node, a separate network appliance, or a rack mounted blade. In this regard, source node 210 and destination nodes 230 may be VMs that reside in a data center, different data centers, or in the same chassis.

Figure 2B:
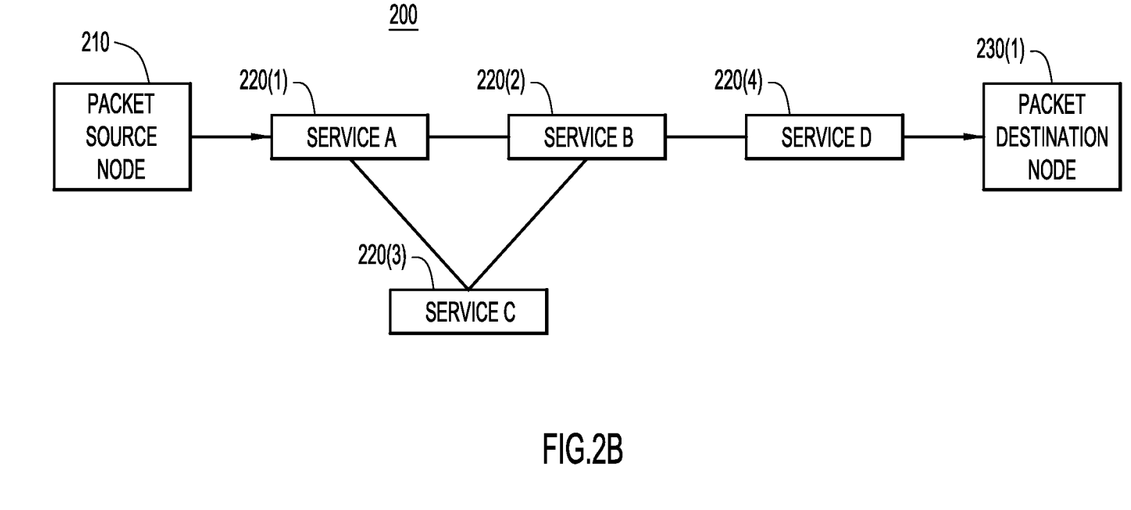
FIG. 2B shows an example of the network services from FIG. 2A arranged in a service chain.

Referring to FIG. 2B (with continuing reference to FIG. 2A), services 220 are arranged in an example service chain 200 for servicing packets from source node 210. The central controller 110 has determined that all packets receive Services A, B, and D, while some packets may be classified to receive Service C. Accordingly, service chain 200 is an arrangement of services that form a service profile, e.g., profile "X." Profile X may be requested by the tenant to service packets from source node 210 en route to a destination node 230(1). Central controller 110 looks up profile X and performs, e.g., a rule or policy lookup. The lookup may result in a service topology macro that can be used to generate service chain 200. For example, topology widgets or subgraphs may be mapped or instantiated to ultimately "stitch" together services to form a service chain, e.g., service chain 200.

In one example, the macro calls for Services A-D (and their respective host appliances) to be spun up on their respective service nodes, if not already running Layer 3 connections between each service are established using flow programming, e.g., A→B, A→C, C→B, and B→D, forming service chain 200 that fulfills profile X in the service request. Service chain 200 is assigned an identifier, e.g., "ID1." The packet flow from source node 210 to Service A is flow programmed using ID1, e.g., ID1 maps to a Virtual Extensible Local Area Network (VXLAN) tunnel. Likewise, the packet flow from service D to destination 230(1) is flow programmed using ID1. Thus, packets sent from source node 210 to destination node 230(1) are serviced via service chain 200. Although not described in detail, packets from destination node 230(1) to source node 210 on a reverse path may also be serviced by service chain 200.

Figure 3:
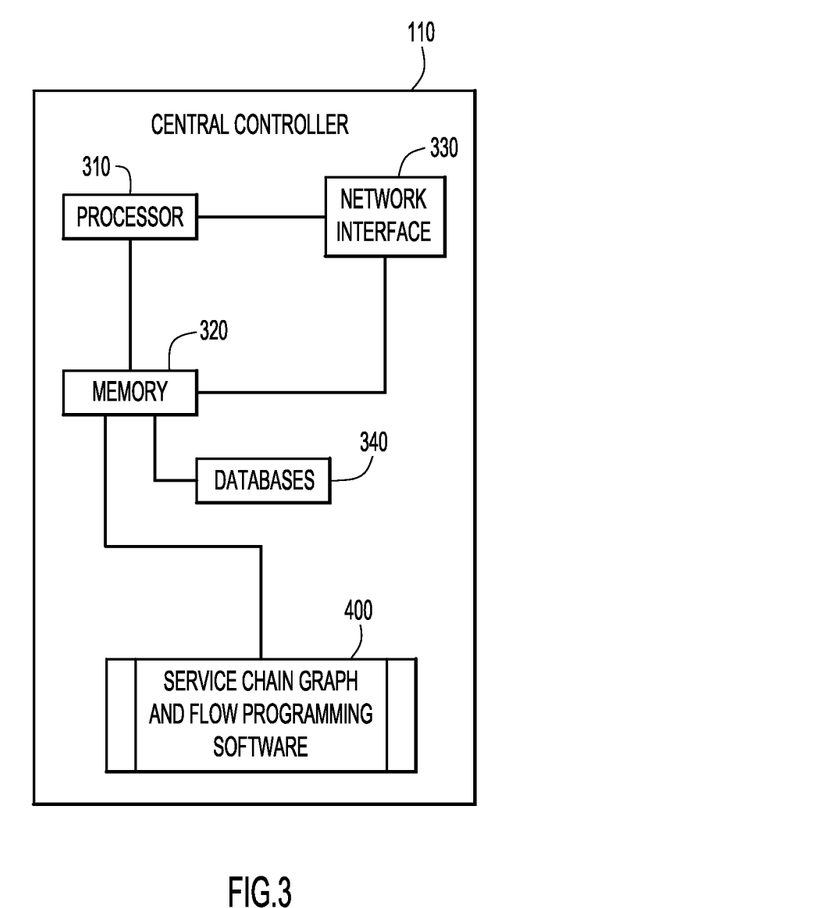
FIG. 3 shows an example central controller device configured to generate a subset of the graph shown in FIG. 1 based on a service request and flow programming of those services using the graph subset.

Turning now to FIG. 3, an example block diagram for a controller or network node is shown, e.g., central controller 110. The central controller 110 is configured to perform the operations described herein for a service chain graph and flow programming software process 400. The controller 110 includes one or more processors 310, memory 320, and a network interface unit 330. The processor 310 may be a microprocessor or microcontroller. The network interface unit 330 facilitates network communications between the controller 110 and the network nodes, e.g., source and destination nodes, service nodes, etc. The processor 310 executes instructions associated with software stored in memory 320. Specifically, the memory 320 stores service chain creation graph and flow programming software 400 that, when executed by the processor 310, causes the processor 310 to perform the operations for the controller described herein with respect to FIGS. 1, 2A, 2B, and 4-7. The memory 320 also stores databases 340 that may include a service function database that contains data about the service functions active on each of the network nodes, and attributes about those service functions, as well as a graph DB 125. The memory 320 also stores any rules, policies, and macros to facilitate the techniques described herein. Alternatively, the graph DB 125 may be stored in a separate network device.

The memory 320 may comprise read only memory (ROM), random access memory (RAM), magnetic disk storage media devices, optical storage media devices, flash memory devices, electrical, optical, or other physical/tangible memory storage devices. In general, the memory 320 may comprise one or more tangible (non-transitory) computer readable storage media (e.g., a memory device) encoded with software comprising computer executable instructions and when the software is executed (by the processor 310) it is operable to perform the operations described herein.

Figure 4:
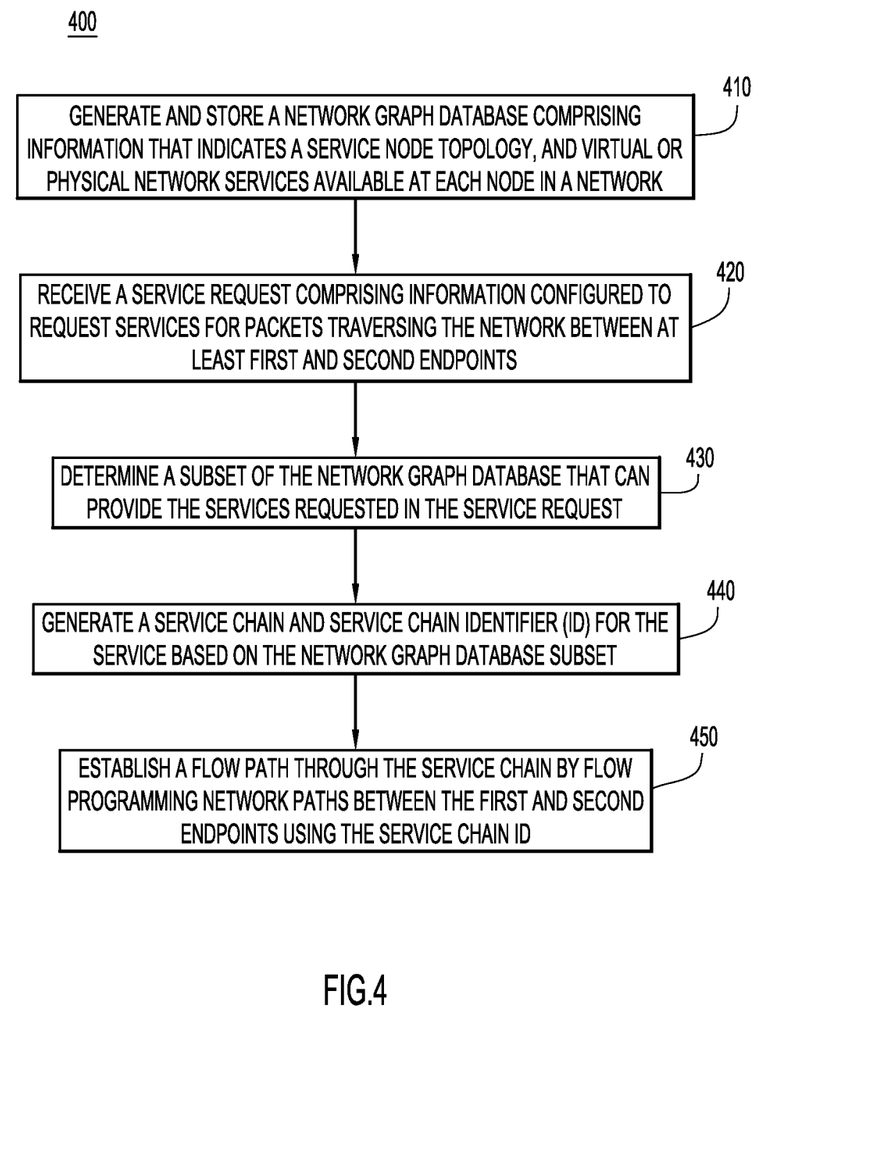
FIG. 4 is an example of a flowchart for flow programming a service chain by a central controller using the network graph.

Referring to FIG. 4, a flow chart depicting the operations performed at central controller is now described for executing service chain creation graph and flow programming software 400. At 410, a network graph database, e.g., graph DB 125, is generated and stored, the network graph database comprising information that indicates a service node topology, and virtual or physical network services available at each node in a network. The graph database may be generated and stored ahead of time and may configured with subgraphs and topology widgets that can be assembled to create service chains. The graph database may be generated separately by another device and supplied to the central controller, e.g., central controller 110.

At 420, a service request is received comprising information configured to request services for packets traversing the network between at least first and second endpoints. At 430, a subset of the network graph database is determined that can provide the services requested in the service request. The graph subset may contain topology information for service chain creation as described above. At 440, a service chain and service chain identifier (ID) is generated for the service based on the network graph database subset, and at 450, a flow path is established through the service chain by flow programming network paths between the first and second endpoints using the service chain ID substantially as described above. Further embodiments and features are described hereinafter.

Figure 5A:
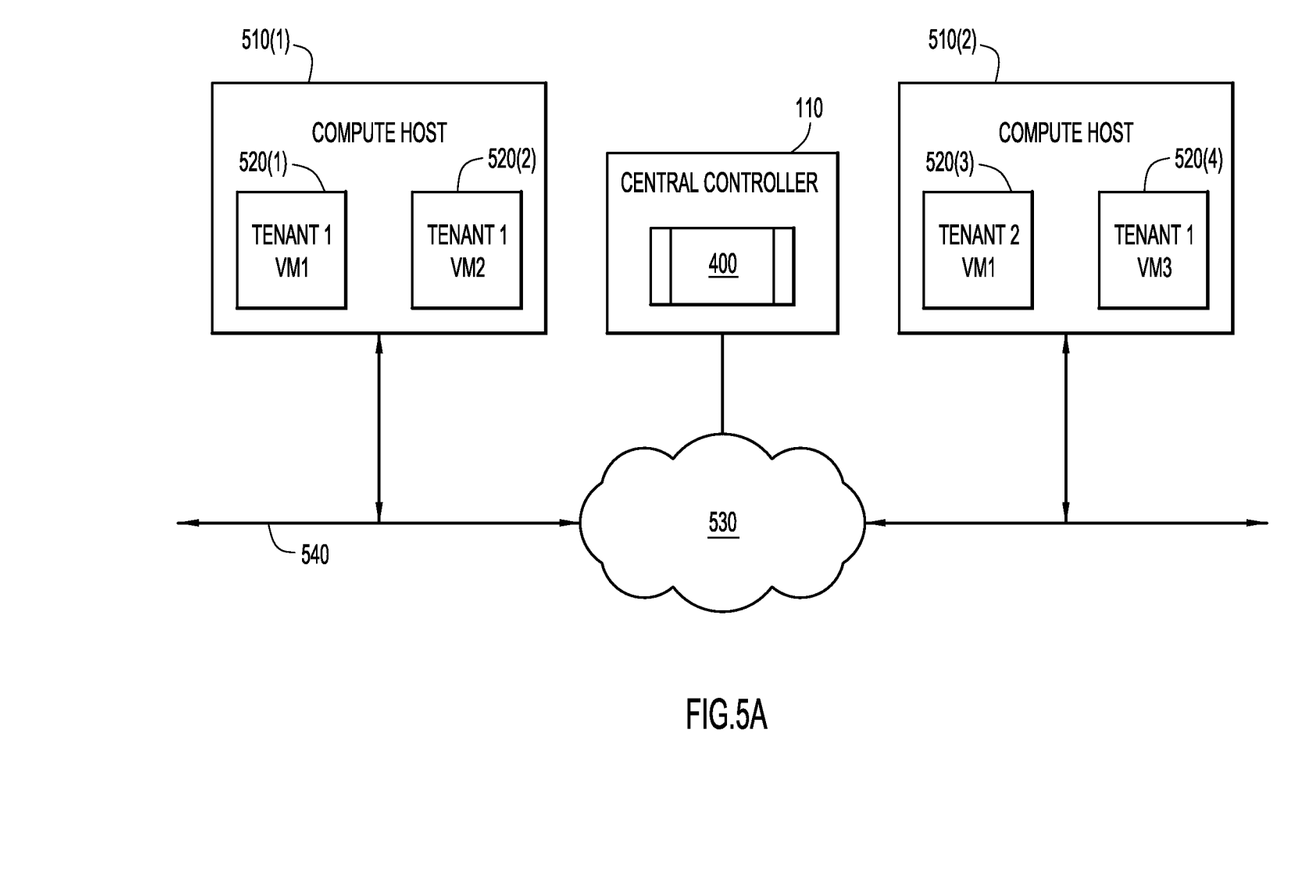
FIG. 5A depicts an example topology of a multi-tenant network with hosts servicing a plurality of tenants that is analyzed for service instantiation or creation.

Referring now to FIG. 5A, an example topology of a multi-tenant network is described with hosts servicing a plurality of tenants, where the topology is analyzed for service instantiation or creation. The topology depicts a network 530, two compute hosts 510(1) and 510(2), and central controller 110, each coupled by network 530 using network links 540. Host 510(1) is hosting VMs for Tenant 1, i.e., VM1 520(1) and VM2 520(2). Host 2 is hosting VMs for Tenant 1 and Tenant 2, i.e., VM1 520(3) and VM3 520(4) as shown in the figure.

Tenant 1 requests a service, such as service X described above. In this example, Tenant 1 requests router services. Central controller 110 analyzes the topology for Tenant 1 and finds:

Tenant 1 VMs 520(1) and 520(2) on host 510(1);
Tenant 1 and VM 520(4) on host 510(2); and that
Host 510(1) and host 510(2) are connected by a Layer 3 fabric.

Central controller 110 generates a service chain ID, e.g., ID1, and maps ID1 to, e.g., a VXLAN tunnel ID, e.g., a Virtual Network ID (VNI) "VNI1."

Figure 5B:
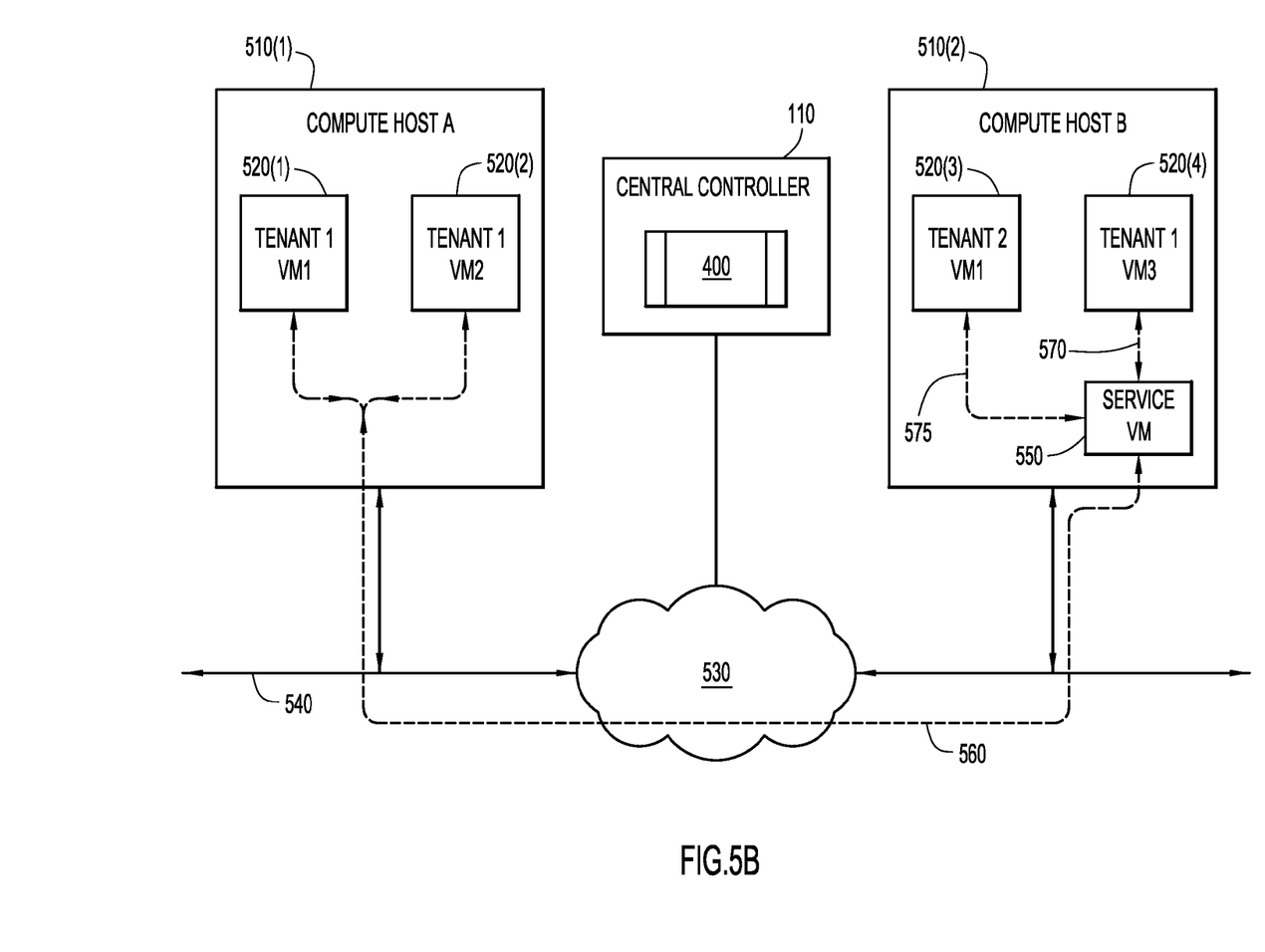
FIG. 5B depicts a first example of service creation in the multi-tenant network from FIG. 5A using a hosted service node.

Turning to FIG. 5B, the central controller 110 instantiates service VM 550 on a specific host. In this example, a router VM is instantiated on host 510(2). The router 550 is assigned an IP address and may be configured as a default gateway for Tenant 1. Router 550 is provisioned with routing information in order to properly route traffic for Tenant 1. A VXLAN tunnel 560 is created between host 510(1) and host 510(2). Using flow programming, traffic from VMs 520(1) and 520(2) on host 510(1) is programmed with flow rules to be sent into the VXLAN tunnel 560 to host 510(2). Traffic from VM 520(4) on host 510(2) is programmed with flow rules to be sent directly to router 550 using path 570. Service X is now available to Tenant 1. In this example, router 550 is multi-tenant aware and can route traffic for Tenant 2 VM1 using path 575.

Figure 5C:
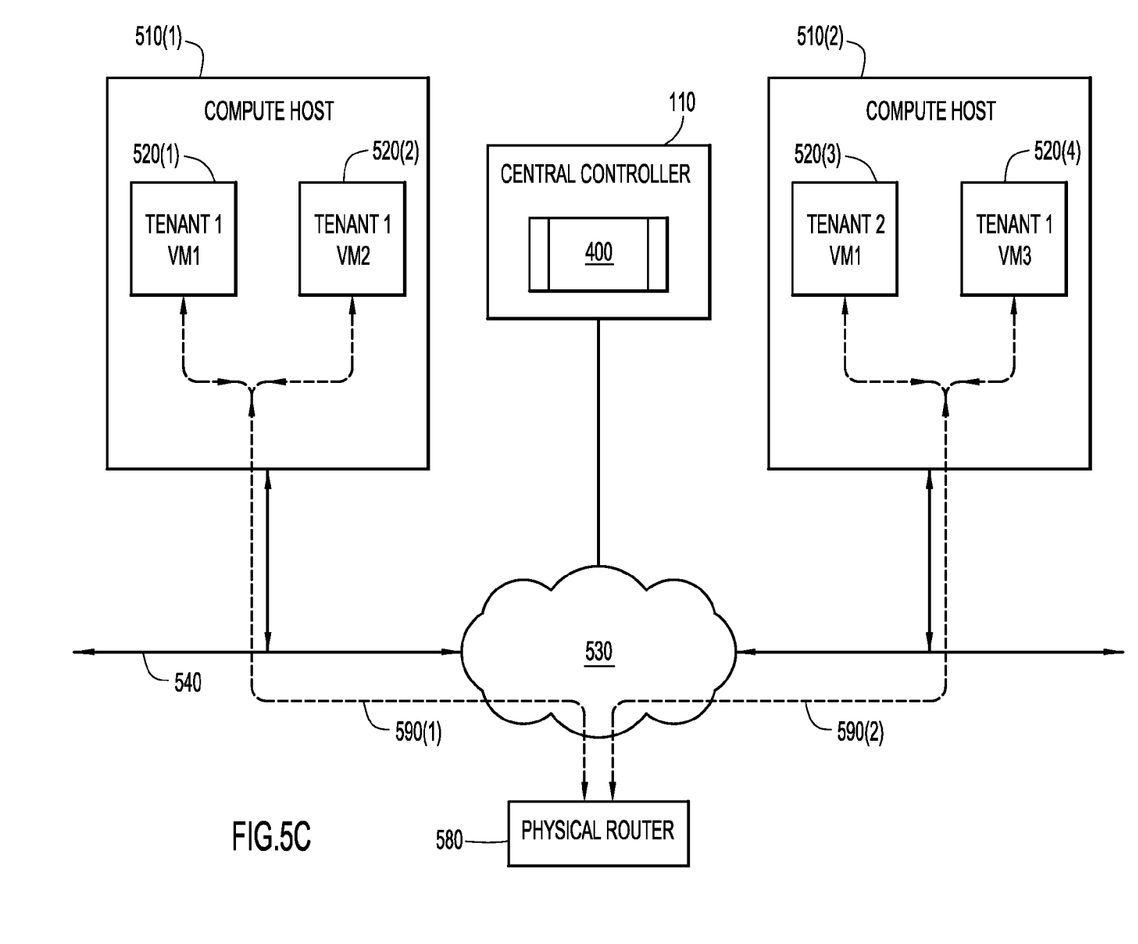
FIG. 5C depicts a second example of service creation in the multi-tenant network using a physical router.

Referring again to FIG. 5A together with 5C, a second example of service creation is described when a physical router is employed. In this example, the central controller 110 analyzes the topology for Tenant 1 and maps service chain ID1 to VXLAN tunnel VNI1 as described above in connection FIG. 5A. In FIG. 5C, a physical router 580 has been added and coupled to network 530. The central controller 110 provisions the router 530 with the appropriate routing tables. In virtualized environments a virtual routing forwarding (VRF) configuration may be provisioned in router 580. In one example, VRF enables multiple instances of the routing table to be used to allow reuse of network addresses without conflict, thereby enabling a separate routing table for each tenant.

Central Controller 110 sets up VXLAN tunnels 590(1) and 590(2) between router 580 and each host 510(1) and 510(2), respectively. Traffic from VMs 520(1) and 520(2) on host 510(1) are programmed with flow rules to be sent into the VXLAN tunnel 590(1) to the physical router 580, and vice versa. Likewise, traffic from VMs 520(3) and 520(4) on host 510(2) are programmed with flow rules to be sent into the VXLAN tunnel 590(2) to the physical router 580, and vice versa. Service X is now available to Tenant 1.

An example of OpenFlow flow programming commands are provided below. These commands are from the viewpoint of commands received by switch 580. In the example below, there are comments to indicate the direction of the flow to and from router 580, e.g., using the characters "--" to indicate an inline comment.

```
--VM1 sending traffic to VM3:
    ovs-ofctl add-flow bridge
      in_port=A,actions=set_tunnel,tunnel_id=10,
        type=NVGRE \
      src_ip=HOST1,dst_ip=HOST2,out_port=B
--VM1 receiving traffic from VM3:
    ovs-ofctl add-flow bridge
      in_port=B,actions=strip_tunnel,tunnel_id=10,
        type=NVGRE \
      src_ip=HOST2,dst_ip=HOST1,out_port=A
--VM3 sending traffic to VM1:
    ovs-ofctl add-flow bridge
      in_port=A,actions=set_tunnel,tunnel_id=20,
        type=VXLAN \
      src_ip=HOST2,dst_ip=HOST1,out_port=B
--VM3 receiving traffic from VM1:
    ovs-ofctl add-flow bridge
      in_port=B,actions=strip_tunnel,tunnel_id=20,
        type=VXLAN \
      src_ip=HOST1,dst_ip=HOST2,out_port=A
```

The above program sample is for two VMs, VM1 and VM3, that reside on separate hosts, HOST1 and HOST2, respectively. VM1 and VM3 may correspond to VM1 520(1) and VM3 520(4), respectively, while HOST1 and HOST2 may correspond to compute hosts 510(1) and 510(2), respectively. In the code above, the term "ovs-ofctl" is an OpenFlow function call that uses the "add-flow bridge" command and the two lines following each ovs-ofctl command sets up the corresponding flow. The flow bridges have two VXLAN tunnels with ID's, e.g., VNI's, of 10 and 20. VXLAN 10 may correspond to VXLAN tunnel 590(1) and VXLAN 20 may correspond to VXLAN tunnel 590(2). The router 580 routes traffic between VXLAN 10 and VXLAN 20 by way of the flows established by the OpenFlow code listed above.

The flow bridges are unidirectional and communicate over bidirectional VXLAN tunnels 10 and 20. Each flow is assigned a port on router 580, e.g., A or B, in the above example. The flow configuration sets the input port (in_port), output port (out_port), associated tunnel (tunnel_id), source IP (src_ip) address, and destination IP (dst_ip) address. The set_tunnel option pushes packets onto the corresponding tunnel and the strip_tunnel option pulls packets of the corresponding tunnel. Flows can be stopped or eliminated by other OpenFlow operations. Accordingly, complete service chain control can be achieved using flow programming.

In summary, techniques are presented herein to generate and store a network graph database comprising information that indicates a service node topology, and virtual or physical network services available at each node in a network. A service request is received comprising information configured to request services for packets traversing the network between at least first and second endpoints. A subset of the network graph database is determined that can provide the services requested in the service request. A service chain and service chain identifier (ID) is generated for the service based on the network graph database subset. A flow path is established through the service chain by flow programming network paths between the first and second endpoints using the service chain ID.

A packet may be sent from the first endpoint to the second endpoint by way of the flow path and the packet is serviced using the service chain as the packet traverses the flow path. When the packet flow is established, each service may be started at a corresponding service node in the service chain. To establish the packet flow a path specific network layer 2 or layer 3 tunnel is provisioned between the first and second endpoints. The path specific network layer 3 tunnel may be one of a Virtual Local Area Network (VLAN) tunnel, a Virtual Extensible Local Area Network (VXLAN) tunnel, Generic Routing Encapsulation (GRE) tunnel, Network Virtualization Generic Routing Encapsulation (NVGRE) tunnel, and Locator/Identifier Separation Protocol (LISP) tunnel.

For each packet flow, flow entries may be generated and added to a flow table. Packet flows may be redirected by adding or removing entries in the flow table, where the flow table includes information for a service chain hierarchy. The packet flows may be established by way of a central controller configured to manage the network services in the network. The network services may be scaled by clustering a plurality of central controllers.

A selection of the network services available in the network may be presented to a user via a user application interface for user service selection, where the subset of the network graph database is determined based on user service selections. The network graph database may comprise information that includes physical network node location, the virtual or physical network services available at each network node, paths between network nodes, and tenant association.

A central controller handling the insertion of network services by performing flow programming has one or more of the following advantages: 1) Scalability. As the controller is scaled, the ability to scale the adding and removing services is improved. 2) Since services are programmed using flow programming on the host, service redirection becomes available by adding a new flow entry and removing the existing flow entry. 3) State management at the server can be scaled by clustering the controller with a scalable graph database, e.g., neo4j, which is known to scale well. By way of example, the simplified controller architecture may be as follows:

Hypervisor flow programming <-----> Controller <------> Model (neo4j)

The controller is stateless, and as such, can be replicated. The hypervisor flow programming state has a small footprint and is stored on the hypervisor, so it scales linearly. Similarly, topology macros have small service topologies and scale relatively linearly with the number of nodes (unlike in generic graphs where edges can grow quadratically).

In summary, a method is provided generating and storing a network graph database comprising information that indicates a service node topology and virtual or physical network services available at each node in a network; receiving a service request for services to be performed on packets traversing the network between at least first and second endpoints; determining a subset of the network graph database that can provide the services requested in the service request; generating a service chain and service chain identifier for the service based on the network graph database subset; and establishing a flow path through the service chain by flow programming network paths between the first and second endpoints using the service chain identifier.

Similarly, an apparatus is provided comprising a network interface unit configured to enable communications over a network including a plurality of network nodes each configured to apply a service function to traffic that passes through the respective network node; and a processor coupled to the network interface unit. The processor is configured to: receive a service request for services to be performed on packets traversing the network between at least first and second endpoints; determine a subset of a network graph database that can provide the services requested in the service request, wherein the network graph database comprises information that indicates a service node topology and virtual or physical network services available at each node in the network; generate a service chain and service chain identifier for the service based on the network graph database subset; and establish a flow path through the service chain by flow programming network paths between the first and second endpoints using the service chain identifier.

Further still, one or more computer readable storage media are provided, encoded with software comprising computer executable instructions and when the software is executed operable to: receive a service request for services to be performed on packets traversing the network between at least first and second endpoints; determine a subset of a network graph database that can provide the services requested in the service request, wherein the network graph database comprises information that indicates a service node topology and virtual or physical network services available at each node in the network; generate a service chain and service chain identifier for the service based on the network graph database subset; and establish a flow path through the service chain by flow programming network paths between the first and second endpoints using the service chain identifier.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
   receiving, in a network comprising a plurality of virtual machines hosted by a plurality of nodes, a service request for network services to be performed on packets traversing the network from a first virtual machine hosted by a first node to a second virtual machine hosted by a second node;
   determining a service node topology of the network and virtual or physical network services available at each node in the network;
   generating a service chain and a service chain identifier corresponding to the generated service chain for the network services, the service chain comprising an ordered list of the network services to be applied to the packets traversing the network;
   starting each requested network service at a corresponding node in the service chain;
   establishing a flow path based upon the service chain by flow programming network paths between the first virtual machine and the second virtual machine using the service chain identifier; and
   sending the packets from the first virtual machine to the second virtual machine by way of the flow path, wherein the packets are serviced at and sent directly to corresponding nodes based upon the ordered list of the network services of the service chain as the packets traverse the flow path.

2. The method of claim 1, wherein establishing the flow path comprises establishing a path specific network layer 2 or network layer 3 tunnel between the first node and the second node.

3. The method of claim 2, wherein establishing the path specific network layer 3 tunnel comprises establishing one of a Virtual Local Area Network (VLAN) tunnel, a Virtual Extensible Local Area Network (VXLAN) tunnel, a Generic Routing Encapsulation (GRE) tunnel, a Network Virtualization Generic Routing Encapsulation (NVGRE) tunnel, and a Locator/Identifier Separation Protocol (LISP) tunnel.

4. The method of claim 1, wherein establishing the flow path comprises generating flow entries and adding the flow entries to a flow table and redirecting the flow path by adding or removing the flow entries in the flow table, wherein the flow table includes information for a service chain hierarchy.

5. The method of claim 1, wherein establishing comprises establishing the flow path by way of a central controller configured to manage the network services in the network.

6. The method of claim 1, further comprising scaling the network services by clustering a plurality of central controllers.

7. The method of claim 1, wherein starting each requested network service comprises:
   determining that at least one of the requested network services includes a router virtual machine; and
   starting the router virtual machine on one of the plurality of nodes.

8. An apparatus comprising:
   a memory;
   a network interface unit configured to enable communications over a network; and
   a processor coupled to the network interface unit, the processor configured to:
   receive a service request for network services to be performed on packets traversing a network from a first virtual machine hosted by a first node to a second virtual machine hosted by a second node;
   determine a service node topology of the network and virtual or physical network services available at each node in the network;
   generate a service chain and a service chain identifier corresponding to the generated service chain for the network services, the service chain comprising an ordered list of the network services to be applied to the packets traversing the network;
   start each requested service at a corresponding node in the service chain;
   establish a flow path based upon the service chain by flow programming network paths between the first virtual machine and the second virtual machine using the service chain identifier; and
   command that the packets from the first virtual machine to the second virtual machine are sent by way of the flow path, wherein the packets are serviced at and sent directly to corresponding nodes based upon the ordered list of the network services of the service chain as the packets traverse the flow path.

9. The apparatus of claim 8, wherein the processor is further configured to:
generate and store policy based service topology macros including one or more of topology widgets and subgraphs;
perform a policy lookup based on the service request to obtain a service topology macro or a subgraph;
execute the service topology macro when the service topology macro is obtained; and
map and instantiate the subgraph when the subgraph is obtained.

10. The apparatus of claim 8, wherein the processor is further configured to:
generate flow entries;
add the flow entries to a flow table, wherein the flow table includes information for a service chain hierarchy; and
add and remove the flow entries in the flow table to redirect the flow path.

11. The apparatus of claim 8, wherein the processor is further configured to:
establish the flow path by establishing a path specific network layer 2 or network layer 3 tunnel between the first node and the second node.

12. The apparatus of claim 11, wherein the processor is further configured to:
establish the path specific network layer 3 tunnel by establishing one of a Virtual Local Area Network (VLAN) tunnel, a Virtual Extensible Local Area Network (VXLAN) tunnel, a Generic Routing Encapsulation (GRE) tunnel, a Network Virtualization Generic Routing Encapsulation (NVGRE) tunnel, and a Locator/Identifier Separation Protocol (LISP) tunnel.

13. The apparatus of claim 12, wherein the processor is further configured to:
map the service chain identifier to the established path specific network layer 3 tunnel.

14. One or more non-transitory computer readable storage media encoded with software comprising computer executable instructions and when the software is executed operable to:
receive a service request for network services to be performed on packets traversing a network from a first virtual machine hosted by a first node to a second virtual machine hosted by a second node;
determine a service node topology of the network and virtual or physical network services available at each node in the network;
generate a service chain and a service chain identifier corresponding to the generated service chain for the network services, the service chain comprising an ordered list of the network services to be applied to the packets traversing the network;
start each requested network service at a corresponding node in the service chain;
establish a flow path based upon the service chain by flow programming network paths between the first virtual machine and the second virtual machine using the service chain identifier; and
command that the packets from the first virtual machine to the second virtual machine be sent by way of the flow path, wherein the packets are serviced at and sent directly to corresponding nodes based upon the ordered list of the network services of the service chain as the packets traverse the flow path.

15. The non-transitory computer readable storage media of claim 14, further comprising instructions operable to:
generate and store policy based service topology macros including one or more of topology widgets and subgraphs;
perform a policy lookup based on the service request to obtain a service topology macro or a subgraph;
execute the service topology macro when the service topology macro is obtained; and
map and instantiate the subgraph when the subgraph is obtained.

16. The non-transitory computer readable storage media of claim 14, further comprising instructions operable to:
generate flow entries;
add the flow entries to a flow table, wherein the flow table includes information for a service chain hierarchy; and
add and remove the flow entries in the flow table to redirect the flow path.

17. The non-transitory computer readable storage media of claim 14, further comprising instructions operable to establish the flow path by establishing a path specific network layer 2 or network layer 3 tunnel between the first node and the second node.

18. The non-transitory computer readable storage media of claim 17, further comprising instructions operable to establish the path specific network layer 3 tunnel by establishing one of a Virtual Local Area Network (VLAN) tunnel, a Virtual Extensible Local Area Network (VXLAN) tunnel, a Generic Routing Encapsulation (GRE) tunnel, a Network Virtualization Generic Routing Encapsulation (NVGRE) tunnel, and a Locator/Identifier Separation Protocol (LISP) tunnel.

19. The non-transitory computer readable storage media of claim 18, further comprising instructions operable to map the service chain identifier to the established path specific network layer 3 tunnel.

20. The non-transitory computer readable storage media of claim 14, further comprising instructions operable to start a router virtual machine on one of the plurality of nodes.

* * * * *